United States Patent [19]

Short

[11] 3,755,723

[45] Aug. 28, 1973

[54] NOVEL GLASSES, SILVER COMPOSITIONS AND CAPACITORS THEREFROM

[75] Inventor: Oliver A. Short, Wilmington, Del.

[73] Assignee: E. I. du Pont de Nemours and Company, Wilmington, Del.

[22] Filed: Sept. 22, 1970

[21] Appl. No.: 74,465

[60] Related U.S. Application Data
Continuation of Ser. No. 707,942, Feb. 26, 1968, abandoned

[52] U.S. Cl.................... 317/258, 106/49, 252/514
[51] Int. Cl........ H01g 1/00, H01b 1/02, C03c 5/02
[58] Field of Search....................... 317/258; 106/49, 106/39 R, 1; 252/514; 29/569; 117/205

[56] References Cited
UNITED STATES PATENTS

| | | | |
|---|---|---|---|
| 2,588,920 | 3/1952 | Green................................... | 106/53 |
| 2,822,279 | 2/1958 | Larsen et al.......................... | 106/48 |
| 3,305,369 | 2/1967 | Cuhra et al............................. | 106/1 |
| 3,480,566 | 11/1969 | Hoffman............................... | 106/49 |
| 2,633,543 | 3/1953 | Howatt................................ | 317/258 |

FOREIGN PATENTS OR APPLICATIONS 1,019,709  2/1966  Great Britain.................... 106/47 R

*Primary Examiner*—A. B. Curtis
*Assistant Examiner*—Mark Bell
*Attorney*—John J. Klocko, III

[57] ABSTRACT

The glass comprises critical proportionate amounts of PbO, $Bi_2O_3$ and $B_2O_3$. Silver compositions, adapted to be applied to and fired on a reduced titanate ceramic substrate to form thereon electrically conductive, adherent fired on films, comprise 1–10 percent of the novel glass and 90–99 percent finely divided silver dispersed in an inert vehicle. Reduced titanate capacitors are prepared from the silver compositions.

6 Claims, No Drawings

NOVEL GLASSES, SILVER COMPOSITIONS AND CAPACITORS THEREFROM

CROSS-REFERENCE TO RELATED APPLICATION

This application is a continuation of my copending application Ser. No. 707,942, filed Feb. 26, 1968, now abandoned.

BACKGROUND OF THE INVENTION

Capacitors, devices that store electrical energy, comprise conducting plates (electrodes) separated by layers of dielectric. Vitreous compositions or glasses have been utilized as the dielectric elements in the fabrication of electrical capacitors. Materials such as crystalline, barium titanate and various niobates have been substituted for sheets of glass or mica as the dielectric layer in making electrical capacitors because of their higher dielectric constants. Such dielectric bodies have generally been formed by molding the finely divided crystalline material into the desired shape, followed by firing to sinter the particles together.

A reduced titanate capacitor comprises a disc or tube of an alkaline earth titanate substrate that has first been heated in a reducing atmosphere to remove a small part of the oxygen present in the crystals, thus producing a semiconductor substrate. When the reduced titanate is coated with silver on opposite faces to form electrodes, thin non-conductive layers are formed between the semiconductor and the silver. The advantage of such a capacitor over conventional titanate capacitors is that extremely high capacitance is obtained without increasing the physical size of the unit.

Reduced titanate capacitors made from common silver compositions, such as the compositions described by Larsen and Short, U.S. Pat. No. 2,822,279, have somewhat higher capacitance than capacitors made from regular titanate substrates. However, there is a continuing need to produce capacitors which have high capacitance values and relatively low dissipation factors. One or more of these properties can be improved by the use of better silver compositions which are adapted to be applied to and fired onto reduced titanate dielectric substrates to form better electrode films in capacitors.

SUMMARY OF THE INVENTION

This invention relates to novel silica-free glass compositions, silver compositions containing the novel glass and reduced titanate capacitors electroded with these silver compositions. Briefly, the invention is accomplished by utilizing a particular glass which is composed of various metal oxides in critical proportions.

Accordingly, the glass compositions of this invention consist essentially of, by weight, 25–50% PbO, 50–75% $Bi_2O_3$ and 1–10% $B_2O_3$. Additionally, the improved silver compositions of this invention, which are adapted to be applied to and fired on a reduced titanate dielectric ceramic substrate to form thereon an electrically conductive, adherent fired on film, consist essentially of, by weight, 30–90% solids content dispersed in 70–10% of an inert vehicle, said solids consisting essentially of 90–99% finely divided silver and 1–10% finely divided glass frit in accordance with the above-described glass composition. Each of opposite faces of such a reduced titanate substrate may have the above silver composition fired thereon to form a capacitor.

DESCRIPTION OF THE PREFERRED EMBODIMENTS

A new glass composition consisting of a single phase melt of bismuth oxide, lead oxide and boron oxide has been prepared for use as the inorganic binder for silver compositions which are utilized in the formulation of capacitors. The glass compositions of this invention contain a critical combination of the three oxides. The proportions of each component are 25–50% PbO, 50–75% $Bi_2O_3$ and 1–10% $B_2O_3$, respectively; the preferred proportions are 30–45% PbO, 55–70% $Bi_2O_3$ and 2–8% $B_2O_3$. This specific glass has been developed for use in silver compositions which are ultimately utilized in the formation of capacitor electrodes on reduced titanate capacitors. Other common glass constituents, such as silica and alumina, are not present in this novel glass since they produce harmful effects in reduced titanate capacitors (e.g., low capacitance, high dissipation factor). Also, the proportions of each of the desired oxides has been selected so that the silver compositions containing glasses of these oxides will produce capacitors which possess high capacitance, relatively low dissipation factors and desirable conductivity. This is in contrast to other common glasses which do not produce the same desirable results.

The glass compositions of the invention are produced by melting any suitable batch composition yielding the prescribed metallic oxides and proportions thereof. The batch composition is first prepared and then melted to yield a substantially homogeneous fluid glass. The temperature maintained during the melting is not critical but is usually within the range of 1,100°–1,400°C. in order that rapid homogenation of the melt may be obtained.

After a homogeneous fluid product is secured, it may be further processed or fabricated by any procedure well known in the art. Generally, the homogeneous glass fluid will be poured into water or other liquids to form a frit which may then be subsequently ground or comminuted to a powder. The product in this powder form may then be utilized to form the silver compositions. It is pointed out that it is essential in the melting and comminution operations not to contaminate the glass with undesirable constituents such as silica and alumina. These contaminants, which could be picked up from a crucible or ball mill, produce harmful effects in the capacitors.

Silver compositions are prepared by dispersing the finely divided silver and finely divided glass in 10–70% of an inert vehicle. The particle sizes of the metal and of the glass are generally within the range of from 0.01–10 microns, which are sufficiently finely divided to pass through a 325 mesh (U.S. Standard Sieve Scale) stencil screen.

The invention is illustrated by the following examples. In the examples and elsewhere in the specification, all parts, ratios and percentages of materials or components are by weight.

Various glass compositions were prepared in frit form by melting the respective batch compositions in a platinum crucible and pouring the homogeneous melt into water. The fritted products were then ball milled in a steel ball mill with steel balls and water for sixteen hours. The particle size of the glass powders ranged from 0.01–10 microns. The following table discloses some frit compositions suitable for use in the silver compositions of this invention. The frits used consist essentially of 27–47% PbO, 50–70% Bi₂O₃ and 2–8% B₂O₃.

TABLE I

Melt Glass Compositions, Wt. %

|  | A | B | C |
|---|---|---|---|
| $Bi_2O_3$ | 70 | 60 | 50 |
| PbO | 27 | 37 | 47 |
| $B_2O_3$ | 3 | 3 | 3 |

Various silver compositions were prepared employing finely divided metals and the finely divided glass frit of this invention. All were suspended in an inert vehicle consisting of 8 percent ethyl cellulose and 92 percent beta-terpineol. The solids content, which consisted of 97 percent finely divided silver and 3 percent glass frit, was dispersed in 36 percent of the inert vehicle. The silver compositions were printed in the form of electrodes onto barium titanate discs (one-half inch in diameter and 20 mils thick) which had been partially reduced by firing to about 2,200°F. in a hydrogen atmosphere. The silver compositions were fired onto the discs at about 760°C. Copper wire leads were attached to the silver electrodes and the capacitance and dissipation factors of each capacitor were determined. The results are reported below in Table II.

TABLE II

| Example | Glass | Capacitance (microfarads) | Dissipation Factor |
|---|---|---|---|
| 1 | A | 0.36 | 7.5% |
| 2 | B | 0.41 | 7.7% |
| 3 | C | 0.31 | 8.0% |

The above examples demonstrate the highly desirable results obtained from using the silver compositions of this invention. Such capacitance values are not generally obtainable from prior art silver compositions on reduced titanate capacitors.

During the firing of the silver compositions, certain reactions occur at the surface of the reduced titanate substrate to produce the dielectric layer. These reactions are unknown but are considered to be related to reoxidation of the surface layers of the titanate. It is theorized that oxidation occurs during firing to produce a very thin oxidized surface layer of bismuth lead barium titanate having a dielectric constant of about 1,000 and a thickness of about one micron.

The dielectric film which is produced by oxidation of the surface layer of the reduced titanate and the special glass in the silver composition are the key to producing good reduced titanate capacitors. From experiments which were conducted to determine the parameters of this invention, it was concluded that the only practical glass frit to use in the silver composition is the lead-bismuth-borate of this invention. In particular, it was concluded that the most harmful components in the glass for reduced titanate capacitors are alumina and silica. It has also been found that when the amount of B₂O₃ is outside of the 10 percent range, deleterious effects to the capacitance values occur.

In preparing the silver compositions, it is desirable, although not necessary, to disperse the solids in a vehicle. However, if other procedures which do not require a vehicle are used, it is clearly within the scope of this invention to omit the vehicle. Any inert liquid may be utilized as the vehicle. Water or any one of various organic liquids with or without thickening and/or stabilizing agents, and/or other common additives may be used. Examples of organic liquids that can be used are the aliphatic alcohols; esters of such alcohols, for example, the acetates and propionates; the terpenes, such as pine oil, alpha- and beta-terpineol and the like; solutions of resins such as polymethacrylates of lower alcohols, or solutions of ethyl cellulose, in solvents such as pine oil and the monobutyl ether of ethylene glycol monoacetate. The vehicles of copending application, Ser. No. 617,855, now abandoned may also be used. The vehicle may contain or be composed of volatile liquids to promote fast setting after application; or it may contain waxes, thermoplastic resins or the like materials which are thermofluids so that the vehicle-containing composition may be applied at elevated temperatures to a relatively cold ceramic body upon which the composition sets immediately.

The proportions of inert vehicle : solids (glass, silver, etc.) in the silver compositions of this invention may vary considerably depending upon the manner in which the paint or paste is to be applied and the kind of vehicle used. Generally, from 30–90 percent solids are dispersed in from 70–10 percent of the inert liquid vehicle. Preferably, 30–50 percent by weight of vehicle will be used.

It is also possible to include other desirable additives in the silver compositions. In particular, it has been discovered that the inclusion of bismuth resinate in silver compositions, as disclosed in U.S. Pat. No. 3,545,986, is beneficial to reduced titanate capacitors. Therefore, mixtures of the silver compositions of this application and the silver compositions of Ser. No. 707,958 now U.S. Pat. No. 3,545,986 are within the scope of this invention. Other variations, such as adding bismuth resinate to the present silver compositions, are also encompassed by this invention.

Since it is obvious that many changes and modifications can be made in the above-described details without departing from the nature and spirit of the invention, it is to be understood that the invention is not to be limited to said details except as set forth in the appended claims.

What is claimed is:

1. A capacitor comprising a reduced titanate dielectric ceramic substrate having thereon an electrode comprising a silver composition comprising a solids content which consists essentially of, by weight, 90–99 percent finely divided silver and 1–10 percent finely divided glass frit composition consisting essentially of, by weight, 25–50% PbO, 50–75% Bi₂O₃ and 1–10% B₂O₃.

2. A reduced titanate capacitor comprising:
   a. a reduced titanate ceramic substrate
   b. a thin dielectric layer of oxidized titanate adherent to (a) and
   c. an electrically conductive silver-containing film adherent to (b), obtained by firing onto a reduced titanate ceramic substrate a silver composition comprising a solids content consisting essentially of, by weight, 90–99 percent finely divided silver and 1–10 percent of a finely divided glass frit, said glass frit consisting essentially of, by weight, 25–50% PbO, 50–75% Bi₂O₃ and 1–10% B₂O₃.

3. A capacitor according to claim 2 wherein said silver composition consists essentially of, by weight, 30–90% of said solids content dispersed in 70–10% of an inert liquid vehicle.

4. A capacitor according to claim 2 wherein said glass frit consists essentially of 30–45% PbO, 55–70% $Bi_2O_3$ and 2–8% $B_2O_3$.

5. A capacitor according to claim 2 wherein said silver composition has been fired on opposite faces of substrate (a).

6. A capacitor according to claim 2 wherein said glass frit consists essentially of 27–47% PbO, 50–70% $Bi_2O_3$ and 2–8% $B_2O_3$.

* * * * *